March 3, 1942.  G. KENDE ET AL  2,274,707
CAMERA
Filed May 9, 1940  2 Sheets-Sheet 1
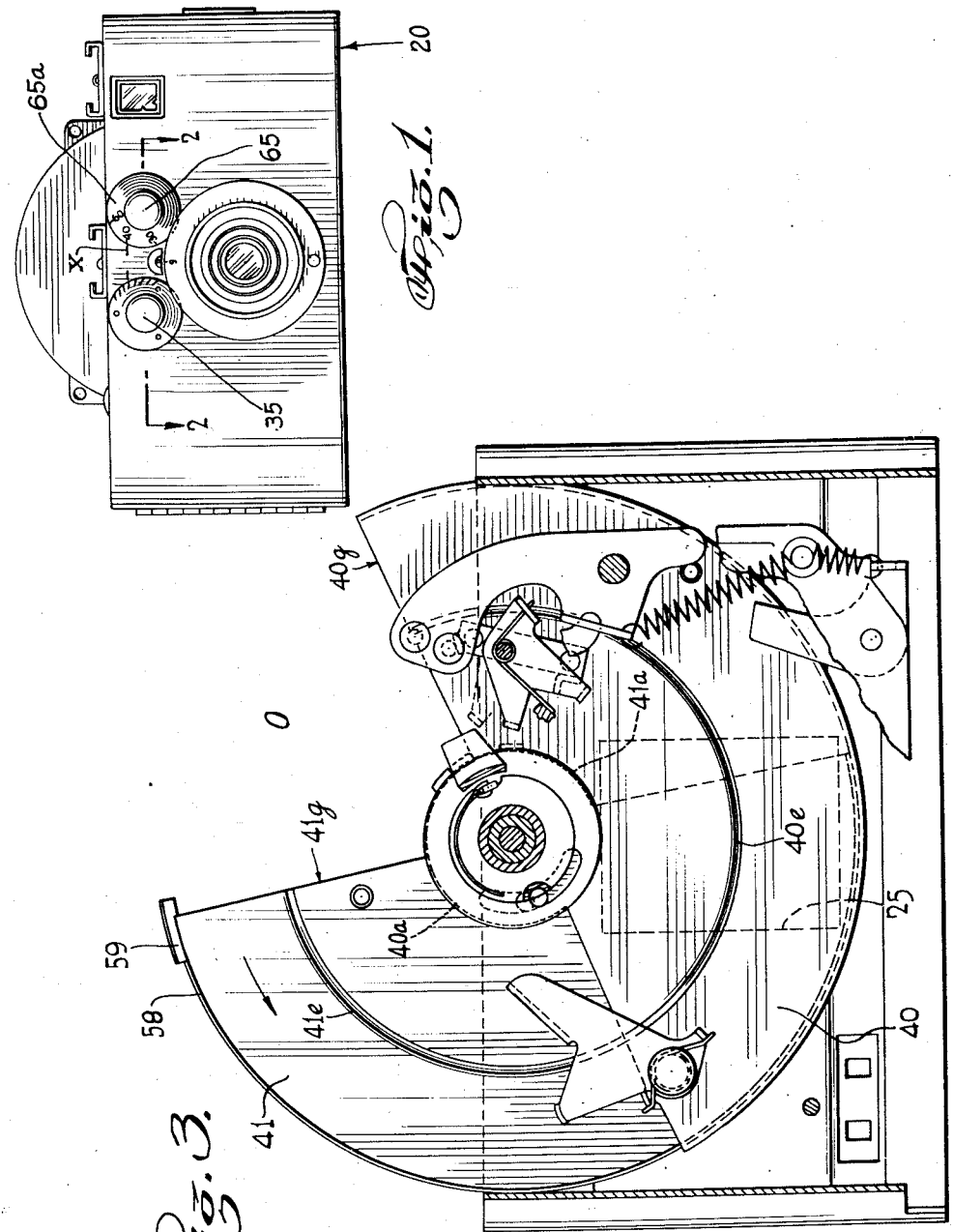
INVENTORS
GEORGE KENDE
PHILIP J. BROWNSCOMBE
BY
ATTORNEY

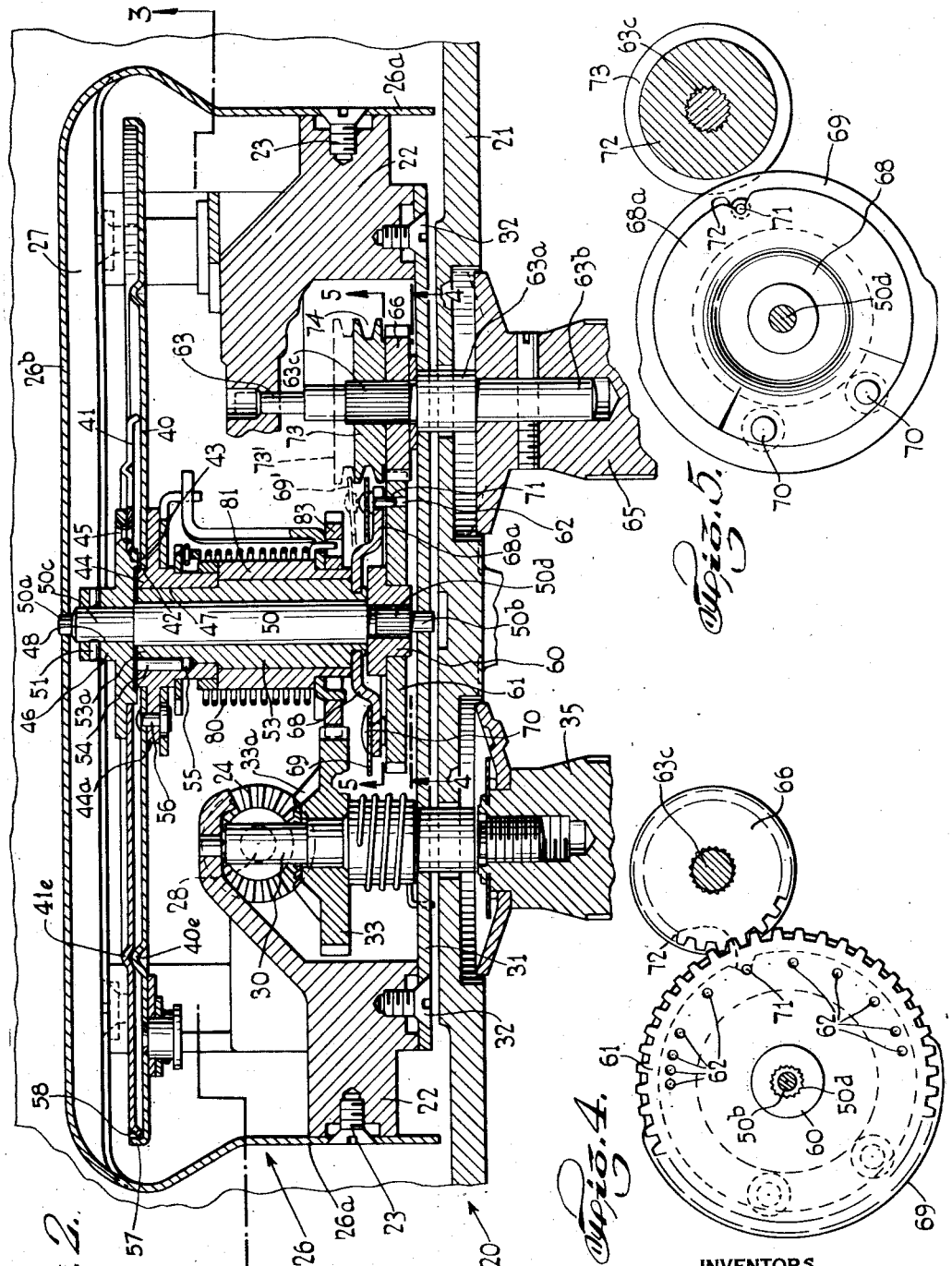

Patented Mar. 3, 1942

2,274,707

UNITED STATES PATENT OFFICE 2,274,707

CAMERA

George Kende, New York, N. Y., and Philip J. Brownscombe, East Orange, N. J., assignors to Universal Camera Corporation, New York, N. Y., a corporation of Delaware Application May 9, 1940, Serial No. 334,204

5 Claims. (Cl. 95—61)

This invention relates generally to cameras. More particularly, our invention relates to an improved and novel construction for camera shutters of the focal plane type and means for operating the same.

One of the objects of our invention is to provide an improved camera shutter construction comprising an adjustable slot in which novel means are provided for selectively adjusting the size of the slot or shutter opening and which at the same time is so arranged that the width of the slot for any given shutter speed is immovably fixed during the operation of the shutter.

Another object of our invention is to provide an improved camera shutter construction comprising a pair of plates in which novel means is employed for mounting the plates so that they may be relatively rotated to selectively provide shutter openings of predetermined sizes.

A further object of our invention is to provide an improved camera shutter construction characterized by the speed and facility of its assembly and by its compactness whereby the same may occupy a minimum of space in the camera, and which at the same time shall operate with a high degree of efficiency.

Other objects of this invention will in part be obvious and in part hereinafter pointed out.

Certain features shown and described but not claimed in this application are shown, described and claimed in the co-pending applications, Serial No. 177,884, filed December 3, 1937, for Camera shutter and means for actuating the same, now Patent No. 2,226,245 of December 24, 1924, and Serial No. 245,424, filed December 13, 1938, for Cameras, now Patent No. 2,233,390 of Feb. 25, 1941, both applications being owned by the assignee of the present application.

The invention accordingly consists in the features of construction, combination of elements, and arrangements of parts which will be exemplified in the construction hereinafter described, and of which the scope of application will be indicated in the claims.

In the accompanying drawings, in which is shown one of the various possible embodiments of this invention, Fig. 1 is a front elevational view of a camera embodying our invention;

Fig. 2 is an enlarged cross-sectional view taken substantially on the line 2—2 of Fig. 1;

Fig. 3 is a cross-sectional view taken substantially on the line 3—3 of Fig. 2, but of reduced size;

Fig. 4 is a cross-sectional view taken substantially on the line 4—4 of Fig. 2; and Fig. 5 is a cross-sectional view taken substantially on the line 5—5 of Fig. 2.

Referring now in detail to the drawings, there is disclosed a camera 20 of the type fully disclosed and described in our co-pending application, Serial No. 245,424, filed December 13, 1938, for Cameras, and comprising a hollow casing 21 within which there is suitably mounted a rigid mounting member 22 (see Fig. 2). Attached to the mounting member 22 by the screws 23 is a frame 26 substantially U-shaped in cross-sectional contour and comprising a pair of parallel legs 26a and an interconnecting longitudinal portion 26b. A part of the portion 26b is longitudinally recessed to form a film track 27 designed to accommodate a film. A light aperture 25 is provided in the said recessed frame portion 26b of the film track 27.

Mounted in the casing wall 21 is a shaft 30, having one end thereof journaled in a specially designed part of the mounting member 22, while the other end thereof is journaled in a plate 31 fixed to the member 22 by the screws 32 and disposed adjacent the front wall of the casing 21. A winding knob 35 fixed to an extension of the shaft 30 for rotation therewith and disposed exteriorly of the casing 21 serves to facilitate the rotational movement of the said shaft 30. Fixedly mounted on that portion of the shaft 30 disposed within the camera casing 21 is a combination gear 33 having bevel gear teeth 33a designed to mesh with a bevel gear 24 fixed to a shaft 28 for the purpose of metering out the film from a take-off spool in the manner fully disclosed and described in our said co-pending application, Serial No. 245,424. The said gear 33 is also adapted to cooperate with a spring actuated shutter mechanism, soon to be described in greater detail, for winding the spring by means of the knob 35.

In accordance with our invention and as shown in the said co-pending applications, we have provided a focal plane type of shutter adapted to expose the film adjacent the light aperture 25 and comprising a pair of substantially symmetrical semi-circular blades 40 and 41 provided with ears 40a and 41a respectively. The said ears 40a and 41a are provided with apertures 42 and 43 respectively. Into the aperture 42 there is fixedly mounted in any suitable manner, such as by swaging, a bushing 44, and into the aperture 43 there is fixedly attached, by swaging, a bushing 46, the said bushing being additionally held in fixed position by a rivet 45. The bushings 44 and 46 are provided with apertures 47 and 48 respectively, which are designed to be in axial alignment when the said ears 40a and 41a are positioned in overlapping relationship, as shown in Fig. 3, said shutter blades 40 and 41 being adapted to form a substantially circular shutter member with the aligned axis of the apertures 47 and 48 serving as the axis of rotation of the shutter. The shutter blades 40 and 41 are supported for rotational movement in the following manner: A shaft 50 is provided, having reduced end portions 50a and 50b. The said shaft portion 50a is journaled in the wall 26b of the member 26 and the opposite shaft end 50b is journaled in the plate 31. The said shaft 50 is further provided with a reduced portion 50c larger than and adjacent the portion 50a, which is received in the aperture 48 of the bushing 46. A pin 51 passing through the bushing 46 and frictionally engaging the shaft portion 50c attaches the bushing 46 to the said shaft portion 50c for rotation therewith, so that the shutter blade 41 will rotate whenever the shaft 50 is rotated. The bushing 44 is fixedly mounted on a reduced portion 53a of a sleeve 53 by means of the key 54 in the keyway 55, the said sleeve 53 being freely rotatable on the shaft 50. The shutter blade 40 is attached to a flange 44a of the bushing 44 for rotation therewith by means of a rivet or bolt member 56.

It is thus seen from the above described construction that the shutter blades 40 and 41 may be rotated relatively to each other because of the fact that the shutter blade 40 is rotatable with the sleeve 53 and the blade 41 is rotatable with the shaft 50, and the said sleeve 53 and shaft 50 are relatively rotatable.

It is noted that the blade 40 is slightly larger in diameter than the blade 41 and is provided with a turned-over peripheral edge 57. The blade 41 is also provided with a similar peripheral edge 58, turned in the opposite direction, the said edges 57 and 58 being adjacently disposed as shown in Fig. 2. This serves to reinforce the edges of the blades 40 and 41 and to maintain such blades slightly spaced from each other so that they may be relatively rotated with a minimum of frictional interference. To further reinforce the blades 40 and 41, there is provided a pressed-out groove 40e in the blade 40 and a pressed-out groove 41e in the blade 41. The groove 41e is in alignment with the groove 40e so the ridge of the groove 40e will ride freely in the recess of the groove 41e.

As shown in Fig. 3, one of the shutter blades, such as for example the blade 41, is provided with a projection 59 adapted to serve as an abutment for the peripheral edges 57 and 58 to limit the relative rotational movement of the blades 40 and 41 in two directions.

In accordance with our invention, we have provided the following novel construction for adjustably setting the speed or opening of the shutter from a relatively slight opening to a wide opening, the range of adjustability being substantially from a fraction of a degree to 180 degrees. In Fig. 3 the shutter opening O is shown as set at substantially 90 degrees. To effect this adjustment there is provided a reduced portion 50d of the shaft 50, adjacent to and larger than the end 50b which is roughened or knurled and on which there is fixedly mounted, for rotation with the shaft 50, a bushing 60 (see Fig. 2). Mounted on the said bushing 60, for rotation therewith, is a flat gear member 61 provided with a plurality of transverse apertures 62 circumferentially spaced from each other a predetermined distance, as shown in Fig. 4, the purpose of which will become apparent as the description proceeds. It is seen that when the gear 61 is rotated, the shaft 50 will also rotate to cause rotation of only the shutter blade 41, while the shutter part 40 remains stationary. In this way the effective space between the adjacent straight radially disposed edges 40g and 41g of the blades 40 and 41, defining a shutter opening O, may be varied to provide any selected speed. To facilitate the rotational movement of the shaft 50 for the purpose of varying the shutter opening O, there is provided a shaft 63 journaled at one end in a specially designed part of the mounting member 22 and having a portion 63a of enlarged diameter journaled in the plate 31. On a portion 63b of the shaft 63 projecting outside of the camera casing, there is fixedly attached a knob 65. Fixed to a knurled portion 63c of the shaft 63 for rotation therewith is a gear 66 in mesh with the gear 61. Therefore, in order to adjust the shutter opening O, it is merely necessary to rotate the knob 65, which will result in the rotation of the shaft 50 to simultaneously rotate the shutter blade 41 while the blade 40 remains stationary.

As shown in Fig. 1, and as described in our said co-pending application, Serial No. 245,424, the knob 65 is provided with a flared skirt portion 65a on which there may be provided indicia properly placed in accordance with the shutter speeds, such as for example, 30, 40, 60, etc. These indicia markings are arranged to cooperate with a fixed mark X on the front camera casing wall to define the amount and direction of turning of the knob 65 in accordance with the shutter speed desired.

To lock the shutter blades 40 and 41 in the adjustably selected position so that they will then rotate as a unit to effect an exposure, the following construction is provided: Mounted on the sleeve 53 for rotation therewith is a rigid disc 68 having an offset flange portion 68a (see Figs. 2 and 5). Overlying the inner surface of the flange 68a and attached thereto for rotation therewith is an annular disc member 69 slightly larger in diameter than the said flange portion 68a. The disc 69 is fixed to the flange 68 by any suitable attaching means such as, for example, the pair of rivets 70. It is noted, however, that the rivets 70 are spaced relatively close to each other leaving the major portion of the disc 69 unattached and free to move in a direction away from the flange 68a. Fixedly mounted on the disc 69 is a pin 71 disposed adjacent the periphery of the said disc 69 and projecting inwardly toward the flange 68a and adapted to normally be received in and pass freely through a peripheral notch 72 in the flange 68 (see Fig. 5). The diameter of the pin 71 is slightly less than the diameter of the apertures 62 in the gear 61 so as to be normally freely received in any selected aperture 62. The apertures 62 are arranged to correspond with the indicia markings on the skirt of the knob 65, there being preferably one aperture 62 for each shutter speed adjustment. It is thus seen from the above described construction that when it is desired to set the shutter opening O to any desired shutter speed, such as for example, 1/40, it is necessary to rotate the dial 65 until the 40 marking on the skirt portion thereof is aligned with the fixed mark X on the camera casing, as shown in Fig. 1. This will cause the particular aperture 62 corresponding to the 1/40 speed to be positioned in axial alignment with the pin 71 to be received therein, as clearly shown in Fig. 2. After the said pin 71 is received in the said selected aperture 62, the sleeve 53 will be locked to the gear 61 for rotation therewith, which will cause the said sleeve to rotate with the shaft 50 to thus cause the shutter blades 40 and 41 to rotate as a unit to effect an exposure when the opening O passes over the film aperture 25.

The disc 69 is so positioned and is of such rigidity that it will normally assume a position in which the pin 71 will be disposed within any aperture 62 with which it is aligned. It is therefore seen that when the shutter has once been set and it is desired to change the shutter speed, it will be necessary to exert a sufficient force on the disc 69 in a direction away from the flange 68a to withdraw the pin 71 from its aperture 62, otherwise the gear 61 could not be rotated relatively to the pin 71 to position the said pin 71 in a different aperture 62. Due to the mounting of the disc 69 and to the resilient nature of the material thereof, it will always tend to be restored to its original position as shown in full lines in Fig. 2.

To facilitate the withdrawal of the pin 71 from its aperture 62, there is provided a pulley member 73 having a V-shaped groove 74 in the rim thereof designed to receive therein a portion adjacent the periphery of the disc 69. The pulley 73 is mounted on the shaft portion 63c for rotation therewith. The shaft 63 is so journaled in the members 22 and 31 as to be axially slidable. It is therefore seen that when the knob 65 is pushed inwardly to move the pulley from its full line position 73 to the dotted line position 73', the free and unattached portion of the disc 69 will at the same time be moved to its dotted line position 69' to withdraw the pin 71 from the aperture 62. If, while in this latter position, the knob is turned, the gear 61 may then be rotated relatively to the disc 68 and sleeve 53 through the gear 66 to adjust the shutter speed. The resilience of the disc 69 will restore the knob 65 and shaft 63 to its original extended position to cause the pin 71 to again be received in an aligned aperture 62.

To cause automatic rotation of the shutter shaft 50 after the shutter blades 40 and 41 have been adjustably locked to each other to rotate the shutter as a unit, a spring 80 is employed which is wound around a hollow drum 81 mounted on the sleeve 53 and is constructed and arranged as fully disclosed and described in our said co-pending application Serial No. 245,424. Also as fully disclosed in our said last named co-pending application, a gear 83 fixed to the drum 81 for rotation therewith meshes with the gear 33 for winding the spring 80 whenever the film is advanced to its next picture-taking position.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. In a camera, a shutter device comprising a shaft journaled in said camera, a sleeve mounted on said shaft and relatively rotatable thereto, a first shutter blade, a second shutter blade, means for attaching said first blade to said shaft for rotation therewith, means for attaching said second blade to said sleeve for rotation therewith, means for causing the simultaneous rotation of said blades as a unit, said last named means comprising a gear fixed to said shaft for rotation therewith, a member fixed to said sleeve for rotation therewith and adapted to normally interlock said gear and sleeve for simultaneous rotation, means to permit relative rotation between the blades to selectively adjust the size of the shutter opening formed between the blades, said last named means comprising a second shaft journaled in said camera, a gear on said second shaft permanently meshing with said first shaft gear, said second shaft being axially slidable, and a member on said second shaft adapted to render ineffective the interlocking relationship between the first shaft gear and said sleeve upon axial sliding movement of said second shaft.

2. In a camera, a shutter device comprising a shaft journaled in said camera, a sleeve mounted on said shaft and relatively rotatable thereto, a first shutter blade, a second shutter blade, means for attaching said first blade to said shaft for rotation therewith, means for attaching said second blade to said sleeve for rotation therewith, means for causing said blades to rotate as a unit, said last named means comprising a gear attached to said shaft for rotation therewith, a plurality of openings in said gear other than the spacing between said gear teeth, said openings being circumferentially spaced from each other at predetermined intervals, said predetermined intervals corresponding to the fixed camera shutter speeds, and a member attached to said sleeve for rotation therewith, said member being disposed adjacent to said gear and provided with a projecting pin adapted to be received in any selected gear opening to interlock said shaft and sleeve for simultaneous rotation.

3. In a camera, a shutter device comprising a shaft journaled in said camera, a sleeve mounted on said shaft and relatively rotatable thereto, a first shutter blade, a second shutter blade, means for attaching said first blade to said shaft for rotation therewith, means for attaching said second blade to said sleeve for rotation therewith, means for causing said blades to rotate as a unit, said last named means comprising a gear attached to said shaft for rotation therewith, a plurality of openings in said gear circumferentially spaced from each other at predetermined intervals, said predetermined intervals corresponding to the fixed camera shutter speeds, a pin resiliently supported on said sleeve and normally urged towards said gear, said pin being adapted to be received in any selected one of said gear openings to interlock said shaft and said sleeve for simultaneous rotation, and means for withdrawing said pin from an opening to permit relative rotation of said sleeve and said shaft to vary the shutter speed, said last named means comprising a manually axially slidable shaft journaled in said camera, a gear mounted on said slidable shaft for rotation therewith and permanently meshing with said first shaft gear, and a member fixed to said slidable shaft for movement therewith, said last named member being adapted to resiliently move said pin away from said gear upon sliding movement of said slidable shaft.

4. In a camera, a shutter device comprising a pair of rotatable blades, rotatable means extending from said camera, the axis of rotation of said rotatable means being spaced from the axis of rotation of said blades, means to permit relative rotation between said blades to selectively adjust the size of the shutter opening formed between the blades, said last named means comprising a gear train permanently connecting one of said blades and said rotatable means and means to hold the other of said blades stationary while said rotatable means is manipulated to vary the angular position of said first blade, said rotatable means being also slidable along its axis of rotation, means to normally interlock said blades for simultaneous rotation, and means associated with said rotatable means and actuable upon axial shifting thereof to render ineffective said interlocking means.

5. In a camera, a shutter device comprising a pair of rotatable blades, means to rotatably and non-translatably support said blades, rotatable means extending from said camera, means to permit relative rotation between said blades to selectively adjust the size of the shutter opening formed between the blades, said last named means comprising a gear train permanently connecting one of said blades and said rotatable means and means to hold the other of said blades stationary while said rotatable means is manipulated to vary the angular position of said first blade, said rotatable means being also slidable along its axis of rotation, means to normally interlock said blades for simultaneous rotation, said interlocking means comprising a member rotatable with one of said blades and a member rotatable with the other of said blades, one of said members being spaced away from said blades and being movable translatably relative thereto, and means associated with said rotatable means and actuable upon axial shifting thereof to render ineffective said interlocking means by shifting of said translatably movable member.

GEORGE KENDE.
PHILIP J. BROWNSCOMBE.